United States Patent

[11] 3,577,724

| [72] | Inventor | Max E. Greene |
| | | Bartlesville, Okla. |
| [21] | Appl. No. | 793,996 |
| [22] | Filed | Jan. 27, 1969 |
| [45] | Patented | May 4, 1971 |
| [73] | Assignee | Phillips Petroleum Company |

[54] METHOD OF FIBRILLATING AND TWISTING ORIENTED FILM
5 Claims, 6 Drawing Figs.

[52] U.S. Cl.................................................. 57/157,
28/1, 28/72, 57/34, 57/167, 225/3, 225/97
[51] Int. Cl.................................................. D02g 1/02
[50] Field of Search.......................................... 57/31, 34,
157, 167; 28/1 (bib), 72; 225/3, 97

[56] References Cited
UNITED STATES PATENTS

| 3,253,072 | 5/1966 | Scragg et al. ................ | 28/1UX |
| 3,369,435 | 2/1968 | Boultinghouse............ | 28/1X |
| 3,378,997 | 4/1968 | Matsui et al. ................ | 57/34 |
| 3,427,654 | 2/1969 | Rasmussen.................... | 28/1X |
| 3,460,416 | 8/1969 | Gilbert......................... | 28/1X |
| 3,474,611 | 10/1969 | Suzuki et al. ................ | 57/31 |

Primary Examiner—John Petrakes
Attorney—Young and Quigg

ABSTRACT: An apparatus and method for fibrillating and texturizing an oriented film of thermoplastic material. The apparatus includes a cutting roller rotatable about a fixed axis for cutting elongate slits in said film. The method comprises moving forming elongate slits in a thermoplastic film and texturizing said slit film by the false twisting technique to form a bulky yarn.

PATENTED MAY 4 1971 3,577,724
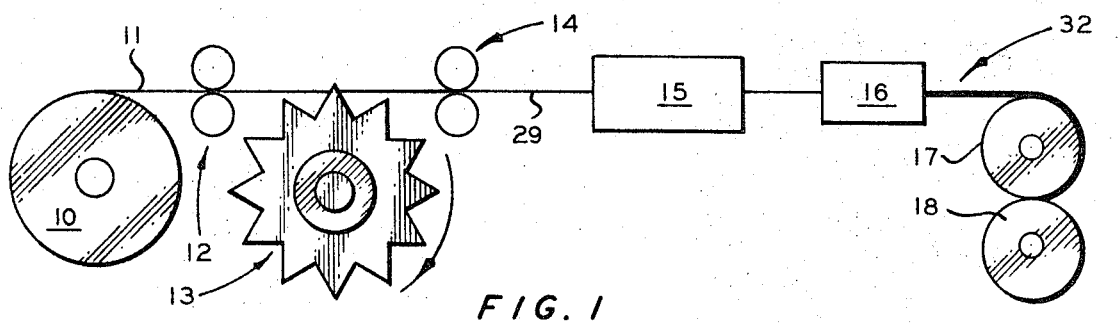
FIG. 1
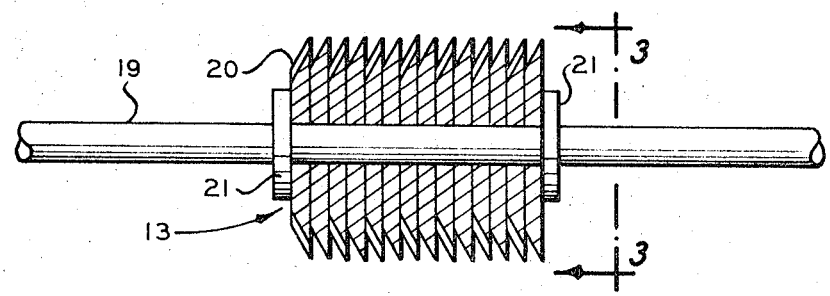
FIG. 2
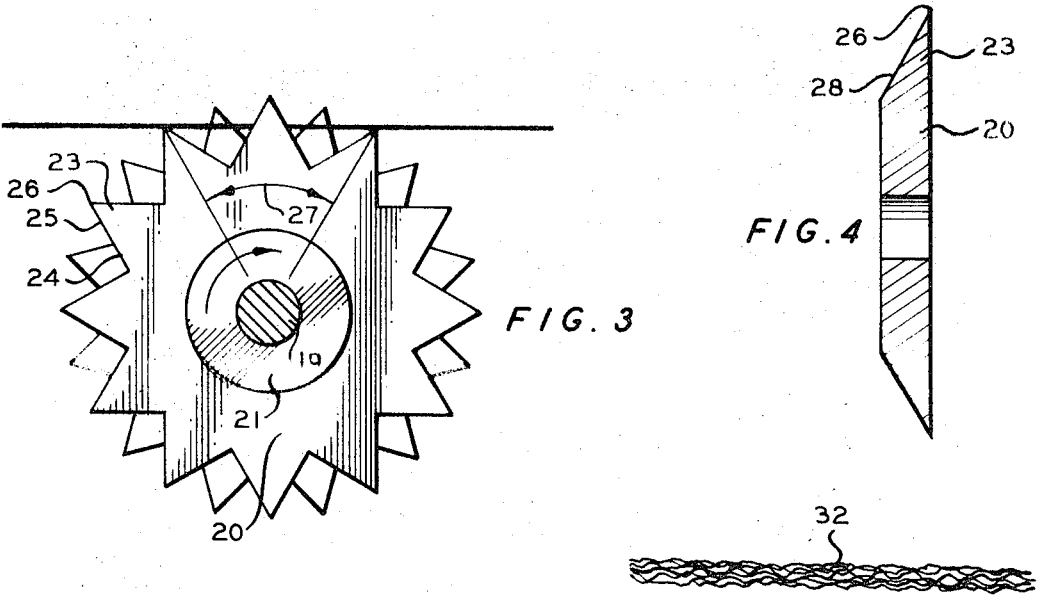
FIG. 3
FIG. 4
FIG. 6
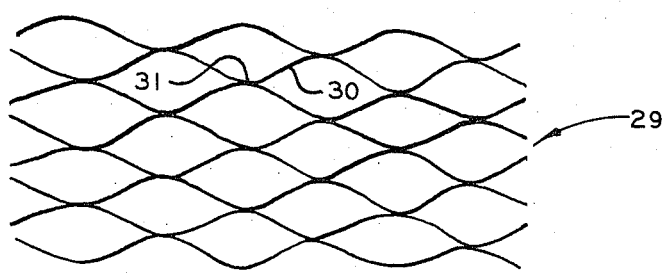
FIG. 5
INVENTOR.
M.E.GREENE
BY Young and Quigg
ATTORNEYS

METHOD OF FIBRILLATING AND TWISTING ORIENTED FILM

This invention relates generally to fibrillation. In one aspect this invention relates to a method for splitting up a film of highly oriented thermoplastic material. In another aspect, this invention relates to an apparatus and method for forming texturized, fibrillated material.

It is well known that many synthetic organic polymers exhibit properties of marked fissility when highly oriented, and consequently are easily fibrillated by the application of mechanical forces. The basic principle of fibrillation involves extruding any type of thermoplastic, linear, high molecular polymer having crystalline properties to form a thin film; stretching or drawing the film to obtain a parallel orientation of the long chained molecules; and, finally, applying a stress on the oriented film to promote the fibrillation, or splitting up, along the lines of weakness created by the orientation. While a variety of processes and devices have been proposed for splitting up the film, all operate either to apply a stress transverse the direction of orientation to force the separation of molecules, or to slit the film with cutting blades. The selection of the type of splitting technique will depend upon the quality and character of the fibrous material desired, which in turn will depend upon the end use contemplated for the material.

For yarns proposed for use in the textile industry, it is desirable that they demonstrate qualities of uniform color and hand. It has been found that fibrous material produced by the mechanical working technique are unsatisfactory for some textile uses because of the nonuniform properties of color and hand exhibited by the material. The nonuniform properties occur because of the difficulty in controlling the degree of fibrillation of the material. Since the force required to initiate the splitting up is many times greater than that required for further development, the resulting material has the character of elongate stem fibers randomly interconnected by cross fibers. The randomly interconnected fibrous material exhibits varying degrees of fibrillation because of the inability of the mechanical working techniques to uniformly terminate fibrillation.

The cutting blade technique, on the other hand, offers a mechanical means which precisely controls the splitting up action and hence the degree of fibrillation. The film is slit by a plurality of cutting blades thereby forming a uniform reticulated pattern, or a regular network structure of coherent fibers resembling expanded metal. The cutting blades actually cut slits of predetermined length in the film. The fibrillated material may be twisted to form a coarse yarn or may be further texturized and twisted to form a yarn having properties comparable to those formed from natural fibers. The texturizing procedure may include the so-called false twist technique which has been found to produce a very soft delustered yarn suitable for knit goods or soft carpet.

An object of this invention, then, is to provide a novel cutting apparatus for fibrillating an oriented film of thermoplastic material; another object is to provide a method for preparing a yarn from man-made fibers which exhibits properties comparable to the natural fibers. These and other objects will become apparent to those skilled in the art from the following disclosure taken in conjunction with the accompanying drawings in which:

FIG. 1 is a diagrammatic view of the fibrillating and texturizing system;

FIG. 2 is longitudinal sectional view of the cutting apparatus shown in FIG. 1;

FIG. 3 is a side elevational view of the cutting mechanism shown in FIG. 2;

FIG. 4 is a sectional view of a cutting blade shown in the cutting apparatus of FIGS. 2 and 3;

FIG. 5 is a view of an expanded portion of fibrous material following the splitting up operation; and FIG. 6 is a view of a longitudinal portion of the texturized fibrous product.

With reference to FIG. 1, the fibrillating and texturizing system is seen to include a supply roll 10 of oriented plastic film from which a film 11 passes through a first set of guide rollers 12, over a cutting roller 13 and through a second set of guide rollers 14, and thence through the texturizing equipment which includes a heater 15, a false twist spindle 16 and a takeup package 17 frictionally driven by drum 18. In commercial operation, it may be desirable to perform the fibrillation and the texturizing in two separate steps because of the different optimum linear film speeds required in each process.

Generally, any orientable plastic film 11 can be employed in this process. The film 11 can be uniaxially, biaxially or other multiaxially oriented condition. The film 11 can be oriented in any conventional manner well known to those skilled in the art including supercooling the film 11 and then orienting same by stretching same. By orientation, what is generally meant to be covered is deforming, e.g., stretching the film 11 below the temperature at which the film is substantially in the molten state, to thereby increase the strength thereof at least in the direction in which it is deformed.

Generally, films 11 of 1-olefins having from two to eight carbon atoms per molecule which have been oriented by stretching in at least one direction so that the film 11 after stretching is at least three times longer in the direction of stretching that it was before stretching, i.e., 3:1, can be used. When film 11 of polyethylene which has density of at least about 0.94 grams per cubic centimeter is employed, the ratio of length in the stretch direction to original length should be at least 4:1 and when polypropylene is employed, this ratio should be at least 6:1. Polymers of 1-olefins can be made in any conventional manner. A particular suitable method is that disclosed in U.S. Pat. No. 2,853,741. The film can be made from the polymers in any conventional manner such as by extrusion, casting, platening, blown tubing and the like.

The film 11 can be any length and width and substantially any thickness, the minimum thickness of the film being only that which will produce a substantially self-sustaining film and the maximum thickness being dictated only by the cutting capacity of the cutting means employed. Preferably, the thickness of the film will vary from that which is sufficient to form a self-sustaining film to 6 mils. Thicker films can be treated by using heavier duty cutting means.

As shown in FIGS. 2 and 3, the cutting roller 13 includes a shaft 19 on which are mounted a plurality of stacked blades 20. The blades are maintained in stacked, assembled relation by flanking collar 21 and 22. The roller 13 is mounted on a suitable support between the guide rollers 12 and 14 and is rotatably driven by conventional means (not shown) about a fixed axis defined by shaft 19.

The periphery of each blade 20 is serrated providing a plurality of circumferentially spaced and triangularly shaped teeth 23 having a leading edge 24 and a trailing edge 25, said edges intersecting at point 26. In this embodiment, a total of 12 teeth 23 is provided and the included angle between the leading and trailing edges 24 and 25 is 44°. The projection or height of each tooth 23 is such to provide complete penetration of the film. Generally, the height will be from about 1 to about 40 times film thickness. As shown in FIG. 4, each tooth 23 has a beveled surface 28 to provide a section of reduced thickness at point 26. The base of each tooth 23 has the thickness of the blade 20. The beveled teeth provide for an axial space between points 26 when arranged in assembled relation. The blades 20 may be composed of any hard material such as mild steel. The total number of teeth 23 and the tooth configuration can be varied depending upon the product desired.

In assembling the blades 20 on the shaft 19, the teeth 23 may be staggered, the points 26 being located 15° apart with reference to the axis of rotation, to produce a product illustrated in FIG. 5. This relationship, too, may be varied if a different product pattern is desired.

The thickness of each blades 20 will, of course, determine the number of cuts per unit width of the film 11. A blade thickness of 0.015 inch provides for about 65 cuts per unit width of the film 11.

The guide rollers 12 and 14 are positioned so that the film 11 will pass the cutting roller at a predetermined space from the shaft 19. The film 11 is moved past the roller 13 in a direction parallel to the plane of the blades 20. Now as the cutting roller 13 is rotated, the tooth 23 of each blade 20 will intersect and slits film 11 in a predetermined segment of rotation, the slitting segment being indicated by arrow 27.

As contemplated by this invention, the cutting roller 13 is driven at such a speed that each tooth 23 passes through the slitting segment 27 at a different rate than that of film 11. Thus, if the linear speed of the film 11 is 25 to 40 percent faster than the orbiting speed of the teeth 23, the film 11 will be slit by the trailing edge 25 of the teeth 23 as the film 11 is pulled past the roller 13. Since the teeth 23 are also moving, a portion of the film 11 will not be slit, this portion providing the junction between the fibers. Now if the orbiting speed of the roller 13 is 25 to 40 percent faster than the linear speed of the film 11, the leading edge 24 of the tooth 23 slits the film 11. Adjacent teeth 23 of each blade 20 are angularly spaced so as to provide for uncut portions. Using a film of polypropylene having a thickness after orientation of 0.7 mils and with a cutting roller 13 having cutting blades 20 of the dimensions recited above, a reticulated fibrillated film 29 of the pattern illustrated in FIG. 5 was produced by driving the roller 13 to provide an orbiting tooth speed of approximately 30 percent slower than the linear speed of the film 11 through segment 27. Note that the fibers 30 are uniformly interconnected at junction 31. By varying the thickness of the blades 20 and the configuration of the teeth, a finer or coarser product may be obtained.

The fibrillated material thus produced is characterized as coarse and may be twisted to form a continuous yarn without further treatment. However, the coarse character of the material limits its use to such applications as carpet.

It has been found that by texturizing the fibrillated material of the type shown in FIG. 5, a yarn comparable to that produced by natural fibers may be obtained. Many texturizing processes may be used but the so-called false twist technique has been found to produce a soft, delustered finish. As shown in FIG. 1, the texturizing technique comprises passing the fibrillated material 11 first through a heater 15, the twist between the rollers 14 and the false twist spindle 16 is set into the yarn by the heater 15 adding bulk to the yarn. Using the fibrillated polypropylene shown in FIG. 5, the texturized product 32 produced by texturizing according to the false twist technique is shown in FIG. 6. Such a product has the delustered appearance and hand of a natural fiber, making it ideally suitable for textiles. The following example illustrates the fibrillation and texturizing steps of this invention.

EXAMPLE I

The cutting blades machined from 0.015-inch thick mild steel were provided with 12 beveled cutting teeth, 30° apart. The blades were assembled on the shaft with the points staggered 15° apart to form a cutting roller. In this arrangement, the points defined a 45° spiral or helix about the longitudinal axis of the roller. The cutting roller was positioned so that a 2-mil thick film of polypropylene oriented 10 to 1 passed through the cutting teeth in a straight line perpendicular to the cutting plane of the teeth. The cutting roller was driven at an angular speed approximately 30 percent slower than the linear speed of the film. The cut film had the pattern shown in FIG. 5. The cut film was then texturized by the false twist technique producing a product illustrated in FIG. 6.

EXAMPLE II

The roller blades, machined from 0.005-inch SAE 195 spring steel were provided with 24 cutting teeth 15° apart. The cutting blades were assembled on the cutter shaft with teeth, adjacent blades being arranged 7.5° apart, thereby forming a 45° spiral or helix along the axis of the roller. Each blade was separated by a 0.002-inch thick spacer. The cutting roller was positioned so that a 2-mil thick film of polypropylene oriented 10 to 1 passed through the cutting teeth in a straight line perpendicular to the cutting phase of the teeth. The cutter roller was driven at an angular speed approximately 30 percent slower than the linear speed of the film. The product yielded from this operation was similar to that shown in FIG. 5 except that the individual fibers were much thinner and the network was more tightly meshed.

While this preferred embodiment has been described in particular detail, it should be emphasized that variations and modifications may be made therein without departing from the scope and spirit of this invention as set forth in the appended claims.

I claim:

1. A method of fibrillating an oriented film of thermoplastic material having parallel lines of weakness, said method comprising the steps of:
   moving said film in a linear direction along said parallel lines of weakness at a predetermined speed; and
   rotating a plurality of cutting blades in engagement with said film with the planes of said cutting blades parallel to the lines of weakness in said film so that said cutting blades move through said film to cut elongated slits in the film solely in directions parallel to said direction of orientation, thereby avoiding cutting of the film in directions other than parallel to the lines of weakness, the rotation of said cutting blades being in a direction and at a speed such that the blades move in the direction of movement of the film as the film is cut and at a speed different than that at which the film is moved.

2. A method, as set forth in claim 1, wherein said cutting blades are rotated at a peripheral speed slower than the linear speed of said film.

3. A method, as forth in claim 1, wherein said cutting blades are rotated at a peripheral speed faster than the linear speed of said film.

4. A method, as set forth in claim 1, further including the step of twisting said slit film to form a yarn.

5. A method, as set forth in claim 4, further including heating the twisted yarn to impart a set and untwisting the yarn.

Disclaimer and Dedication 3,577,724.—*Max E. Greene*, Bartlesville, Okla. METHOD OF FIBRILLATING AND TWISTING ORIENTED FILM. Patent dated May 4, 1971. Disclaimer and dedication filed Dec. 28, 1971, by the assignee, *Phillips Petroleum Company.*

Hereby disclaims said patent and dedicates to the Public the remaining term of said patent.

[*Official Gazette April 11, 1972.*]